(12) United States Patent
Tabouret et al.

(10) Patent No.: US 11,293,378 B2
(45) Date of Patent: Apr. 5, 2022

(54) THRUST REVERSER FOR AN AIRCRAFT ENGINE NACELLE, COMPRISING A PANEL FOR AVOIDING A MOVABLE SLAT OF THE WING, AND NACELLE ASSOCIATED THEREWITH

(71) Applicant: Safran Nacelles, Gonfreville l'Orcher (FR)

(72) Inventors: Alexis Tabouret, Moissy Cramayel (FR); Quentin Girardie, Moissy Cramayel (FR); Jérôme Corfa, Moissy Cramayel (FR); Matthieu Menielle, Moissy Cramayel (FR); Fabrice Provost, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 101 days.

(21) Appl. No.: 16/889,154

(22) Filed: Jun. 1, 2020

(65) Prior Publication Data

US 2020/0291894 A1    Sep. 17, 2020

Related U.S. Application Data

(63) Continuation of application No. PCT/FR2018/053035, filed on Nov. 29, 2018.

(30) Foreign Application Priority Data

Nov. 30, 2017  (FR) .................................... 1761435

(51) Int. Cl.
*F02K 1/72* (2006.01)
*F02K 1/80* (2006.01)
*F02K 1/76* (2006.01)

(52) U.S. Cl.
CPC ................ *F02K 1/72* (2013.01); *F02K 1/763* (2013.01); *F02K 1/80* (2013.01); *F05D 2250/411* (2013.01); *F05D 2260/52* (2013.01)

(58) Field of Classification Search
CPC ............... F02K 1/72; F02K 1/763; F02K 1/80
See application file for complete search history.

(56) References Cited

U.S. PATENT DOCUMENTS

| 2013/0280052 A1* | 10/2013 | Gonidec | ................. F02K 1/766 415/182.1 |
| 2016/0245227 A1* | 8/2016 | Crawford | ................. F02K 1/72 |
| 2017/0089297 A1* | 3/2017 | Boileau | ................... F02K 1/625 |

FOREIGN PATENT DOCUMENTS

| EP | 3059432 | 8/2018 |
| FR | 2758161 | 7/1998 |

(Continued)

OTHER PUBLICATIONS

International Search Report for International Application PCT/FR2018/053035, dated Mar. 26, 2019.

*Primary Examiner* — Andrew H Nguyen
(74) *Attorney, Agent, or Firm* — Burris Law, PLLC

(57) ABSTRACT

A thrust reverser for a nacelle of an aircraft engine includes a movable cowl movable between a closed position in which thrust is not reversed and an open position for uncovering cascades reversing that reverse the direction of the cold air flow diverted from the annular secondary air flow path. The movable cowl includes a radially outer portion disposed proximate a leading edge of an aircraft wing and at least one avoidance panel on the radially outer portion designed to inhibit interference with a movable slat of the leading edge of the aircraft wing. The avoidance panel is pivotally mounted with respect to a fixed structure of the thrust reverser. At least one energy storing device constrains the (Continued)

avoidance panel to bear against the movable cowl, at least when the thrust reverser is in the closed position.

10 Claims, 4 Drawing Sheets

(56) References Cited

FOREIGN PATENT DOCUMENTS

| | | |
|---|---|---|
| FR | 3023324 | 1/2016 |
| WO | 2014052061 | 4/2014 |

* cited by examiner

THRUST REVERSER FOR AN AIRCRAFT ENGINE NACELLE, COMPRISING A PANEL FOR AVOIDING A MOVABLE SLAT OF THE WING, AND NACELLE ASSOCIATED THEREWITH

CROSS-REFERENCE TO RELATED APPLICATIONS

This application is a continuation of International Application No. PCT/FR2018/053035, filed on Nov. 29, 2018, which claims priority to and the benefit of FR 17/61435 filed on Nov. 30, 2017. The disclosures of the above applications are incorporated herein by reference.

FIELD

The present disclosure relates to a thrust reverser for an aircraft nacelle receiving an engine, the nacelle being equipped with a panel for avoiding a movable slat of an aircraft wing, as well as an aircraft nacelle equipped with such a thrust reverser.

BACKGROUND

The statements in this section merely provide background information related to the present disclosure and may not constitute prior art.

An aircraft is moved by several engines such as turbojet engines, each housed in a nacelle also accommodating a set of ancillary actuation devices related to its operation and ensuring various functions when the turbojet engine is in operation or at a stop. These ancillary actuation devices comprise in particular a mechanical system for actuating a thrust reverser.

A nacelle generally has a tubular structure with a longitudinal axis comprising an air inlet upstream of the turbojet engine, a median section intended to surround a fan of the turbojet engine, a downstream section accommodating thrust reversal means and intended to surround the combustion chamber of the turbojet engine. The tubular structure is generally terminated by an ejection nozzle whose outlet is located downstream of the turbojet engine.

The nacelle also typically includes a tip intended to receive an attachment pylon allowing to fix the nacelle and the turbojet engine to a wing of the aircraft.

The term "downstream" means here the direction corresponding to the direction of the cold air flow entering the turbojet engine. The term "upstream" designates the opposite direction.

Modern nacelles are intended to accommodate a bypass turbojet engine capable of generating via the blades of the rotating fan a hot air flow (also called "primary flow") from the combustion chamber of the turbojet engine, and a cold air flow ("secondary flow") which circulates outside the turbojet engine through an annular passage, also called "flow path."

A turbojet engine usually includes a so-called "upstream" portion comprising the blades of the fan and a so-called "downstream" portion accommodating the gas generator.

The downstream section of the nacelle for such an engine generally has an outer structure, called Outer Fixed Structure (OFS) and a concentric inner structure, called Inner Fixed Structure (IFS), surrounding the structure of the engine itself downstream of the fan. The inner and outer structures define a flow path intended to channel the cold air flow which circulates outside the engine. The outer structure includes in certain cases a thrust reverser comprising one or several cowls sliding along the longitudinal axis of the nacelle between a position allowing the exhaust of a reverse air flow and a position preventing such an exhaust.

A known type of thrust reverser, presented in particular in document FR 2758161 A1, includes rear movable cowls sliding axially downstream under the effect of cylinders, by deploying flaps in the annular flow path in order to close at least partially this flow path. These flaps return the cold air flow radially outwards through cascades uncovered during sliding, comprising vanes which direct this flow forwards.

Such a thrust reverser allows, thanks to the reverse air flow, to reduce the braking distance of the aircraft on landing.

Moreover, the wings of certain aircraft include leading edge movable slats which are deployed forward and downward in order to modify the aerodynamic characteristics of these wings, in particular during low speed flight for landing.

In this case, in particular for nacelles of large diameter disposed near the wings in order to maintain sufficient ground clearance below, it is possible to obtain interference between the movable slat of the deployed leading edge, and the movable cowls when they move back to implement the thrust reverser.

In order to avoid this interference, a known type of nacelle includes on each side of the vertical pylon supporting the nacelle, in the area close to the leading edge of the wing located on top of this nacelle, a small fixed cowl also called cowl or avoidance panel which completes the movable cowl to close the complete annular surround of the nacelle. In this case, the fixed avoidance panel does not move back when the cowl is opened, the risk of interference with the leading edge movable slat is eliminated.

In such a configuration, when the avoidance panel is rigidly connected to the fixed structure, it is observed that, during the deformation of the movable structure of the thrust reverser, this reveals surface defects with the avoidance panel. These surface defects imply operating clearances commonly called "step and gaps."

In another known configuration, the avoidance panel can be fixed on the movable structure. In this case, a sliding device is provided allowing to compensate the movement of the latter. Such a configuration necessarily implies, further the operating clearances controlled in this case with the movable structure, operating clearances with the fixed structure, which does not happen when the avoidance panel is fixed on it.

In the context of avoidance panels, it is customary either to not manage these operating clearances between avoidance panel and the movable structure, or to deform the avoidance panel.

Nonetheless, these solutions each have drawbacks.

On the one hand, not managing the operating clearances generate aerodynamic constraints, impacting in particular on performance, and kinematic constraints (re-engagement issues for example).

On the other hand, deforming the avoidance panel by having a hyperstatic system where the avoidance panel would be embedded on the fixed structure but also at the front (in the case where the cutout of the avoidance panel would extend up to the front frame) can work.

Nonetheless, such a solution does not apply if the cutout of the avoidance panel does not extend to the front frame, which is the case when it is arranged to allow reverse flow to pass, for example to optimize the braking capacity of the aircraft by the thrust reverser in reverse jet or indirect jet position. In other words, these deformation solutions only work if the leading edge of the panel corresponds to the front frame. Otherwise, the avoidance panel needs to be rigid so as not to tear off, which is antagonistic to the solution by deformation.

Moreover, it is certainly already known other elements of the nacelle that the avoidance panels which also generate surface defects similar to the interfaces between different parts of the nacelle. This is the case for example of certain hatches fitted to the nacelle.

In this known configuration type, the issue of operating clearances is resolved by a pivot connection on one side and by a bearing on the other, constrained by a lock to lock the closing of the hatch. This bearing and constrained connection is not compatible with the kinematics of the movable cowl because it must be able to move back relative to the fixed structure, which means that such a solution cannot be transposed to an avoidance panel whose kinematics and mobility is of a very different nature.

Such a solution is also not compatible with axial displacements (in the range generally of 500 mm) between the fixed and movable structures.

SUMMARY

This section provides a general summary of the disclosure and is not a comprehensive disclosure of its full scope or all of its features.

The present disclosure provides a thrust reverser comprising an avoidance panel in which the operating clearances are reduced, and in one form the operating clearances are eliminated.

To this end, the present disclosure provides a thrust reverser for an aircraft engine nacelle, the thrust reverser comprising a movable cowl moving back from a closed position where the thrust is not reversed to an open position to uncover cascades reversing the direction of the cold air flow which is deflected from the annular secondary air flow path, the movable cowl including a radially outer portion intended to come close to a leading edge of an aircraft wing, the movable cowl including on the radially outer portion at least one avoidance panel intended to avoid interference with a leading edge movable slat of the aircraft wing, the thrust reverser being remarkable in that the avoidance panel is pivotally mounted relative to a fixed structure of the thrust reverser, the thrust reverser further comprising at least one energy storage device configured so that the avoidance panel is constrained to bear against the movable cowl, at least when the thrust reverser is in the closed position.

Thanks to these characteristics, by introducing a degree of freedom in pivoting between the avoidance panel and the fixed structure, this allows the avoidance panel to follow the deformations of the movable structure in flight, namely in the closed position, of direct jet, of the thrust reverser.

Following these deformations is made possible by a kinematic connection authorizing relative mobility between the avoidance panel and the movable cowl, while compensating clearances which would be synonymous with wear.

According to a particular technical configuration, the avoidance panel is fixed in translation relative to the fixed structure.

According to a technical characteristic, the avoidance panel is fixed to the fixed structure by a pivot connection, provided by hinges longitudinally aligned relative to the thrust reverser. In alternative and/or complementary configurations, other pivoting means can be used such as leaves capable of elastically deforming or dovetail, for example.

Advantageously, in the closed position, the avoidance panel is constrained to contact and to bear against the movable cowl at bearing areas located on a periphery of said avoidance panel.

This configuration is particularly advantageous because it allows reducing the overlap areas between the movable cowl and the avoidance panel. The bearing areas being located at least at one portion of the periphery, this overlap area is reduced.

In one form, these bearing areas are discontinuous on the circumference of the avoidance panel and have at least one upstream bearing area and a downstream bearing area.

Advantageously, the upstream bearing area has an edge having a slope relative to the longitudinal axis so that, when the movable cowl is displaced downstream to the open position, the movable cowl comes radially over the avoidance panel.

More advantageously, in the open position, the avoidance panel is constrained to contact and to bear against the movable cowl at an area located on an external surface of the avoidance panel.

In one form, the bearing area is formed by a contact strip longitudinally extending. In another form, the bearing area is angularly offset relative to the fixed structure.

In a particular technical configuration, the bearing areas have a contact strip arranged to provide the structural and aerodynamic integrity of the avoidance panel and of the movable cowl.

In an advantageous configuration, the energy storage device is an elastic return device, for example a spring.

More advantageously, the energy storage device is disposed between the fixed structure and the avoidance panel so as to force said avoidance panel to bear against the movable cowl.

According to a particular technical characteristic, the avoidance panel is constrained to bear against the movable cowl, in the closed position and in the open position. In this configuration, when the thrust reverser is displaced from its closed position in direct jet to its open position in reverse jet, the movable cowl is displaced in translation downstream radially over the deflection cowl.

The avoidance panel is dimensioned, in particular its longitudinal dimension, so that the constraint it provides against the movable cowl is not at any time of the released kinematics, this as a function of the stroke of the movable cowl.

According to another aspect, the present disclosure also concerns a nacelle for a bypass aircraft turbojet engine comprising an air inlet upstream of the engine, a median section intended to surround an engine fan, a downstream section delimiting an annular flow path adapted for circulating the air flow and accommodating a thrust reverser, the thrust reverser comprising at least one movable cowl, movable between a direct jet position, in which it provides the aerodynamic continuity of the nacelle and an indirect jet position in which it opens a passage in the nacelle by opening cascades disposed around this flow path which receive the cold air flow to return it towards the outside and towards the front, the nacelle being remarkable in that the thrust reverser includes all or part of the above characteristics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
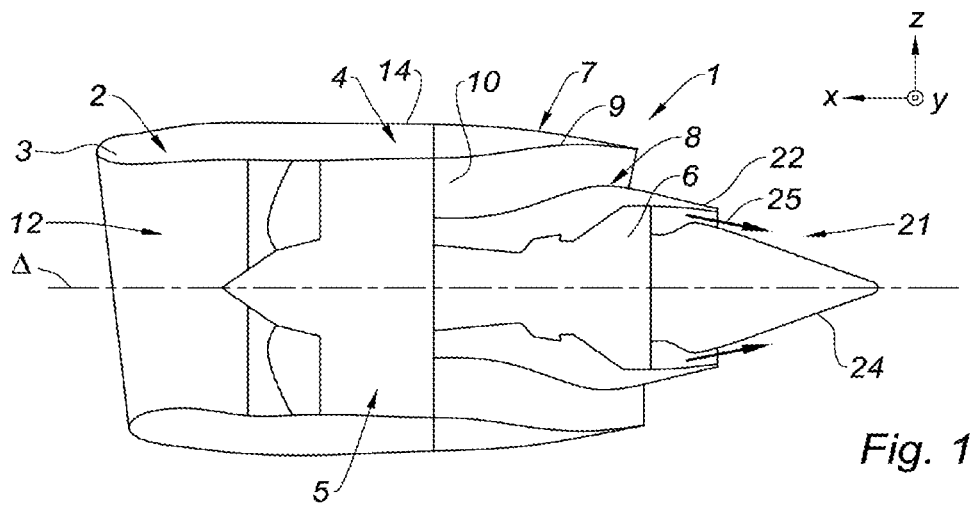
FIG. 1 is a partial schematic section view of a nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As represented in FIG. 1, a nacelle 1 according to the present disclosure has a substantially tubular shape along a longitudinal axis Δ (direction parallel to X). The nacelle 1 comprises an upstream section 2 with an air intake lip 3, a median section 4 surrounding a fan 5 of an engine 6 such as a turbojet engine and a downstream section 7.

The downstream section 7 comprises an inner structure 8 (also called "inner fixed structure" or "IFS") surrounding the upstream portion of the turbojet engine 6, an outer structure (also called "outer fixed structure" or "OFS") 9 and a movable cowl including thrust reversal means. The inner structure or IFS 8 as well as the outer structure or OFS 9 are fixed relative to the movable cowl.

The IFS 8 and the OFS 9 delimit a flow path 10 allowing the passage of an air flow 12 entering the nacelle 1 at the air intake lip 3.

The nacelle 1 includes a tip 14 intended to receive an attachment pylon 16 allowing to fix said nacelle 1 to a wing of the aircraft. To do this, said tip 14 includes means for fixing said pylon 16.

The turbojet engine nacelle is in particular suspended from the pylon 16, by means of a beam 11 at the tip 14.

The nacelle 1 ends with an ejection nozzle 21 comprising an outer module 22 and an inner module 24. The inner 24 and outer 22 modules define a flow channel of the primary airflow 25, called hot, leaving the turbojet engine 6.

Figure 2:
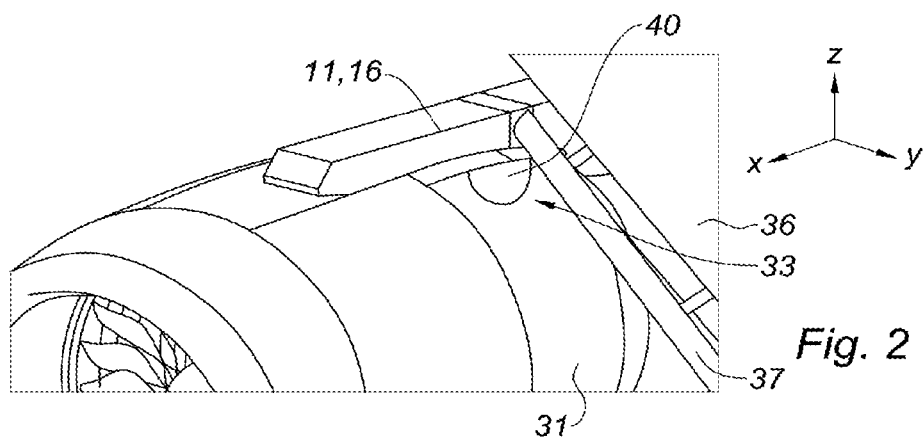
FIG. 2 is a perspective view of a thrust reverser in the closed position according to the present disclosure.
Figure 3:
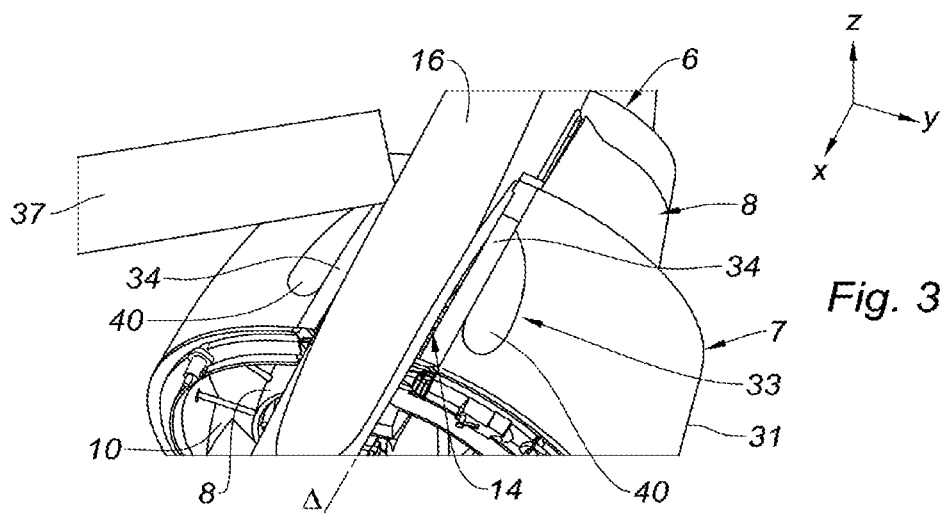
FIG. 3 is a schematic top perspective view of a nacelle according to the present disclosure.
Figure 4:
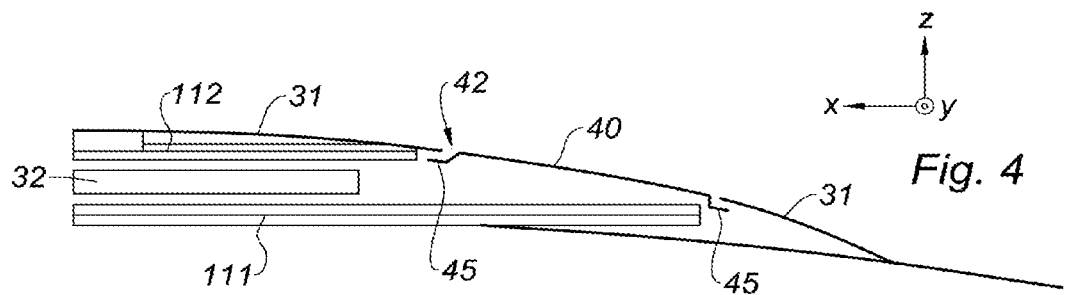
FIG. 4 is a cross-sectional view of a thrust reverser in the closed position according to the present disclosure.
Figure 5:
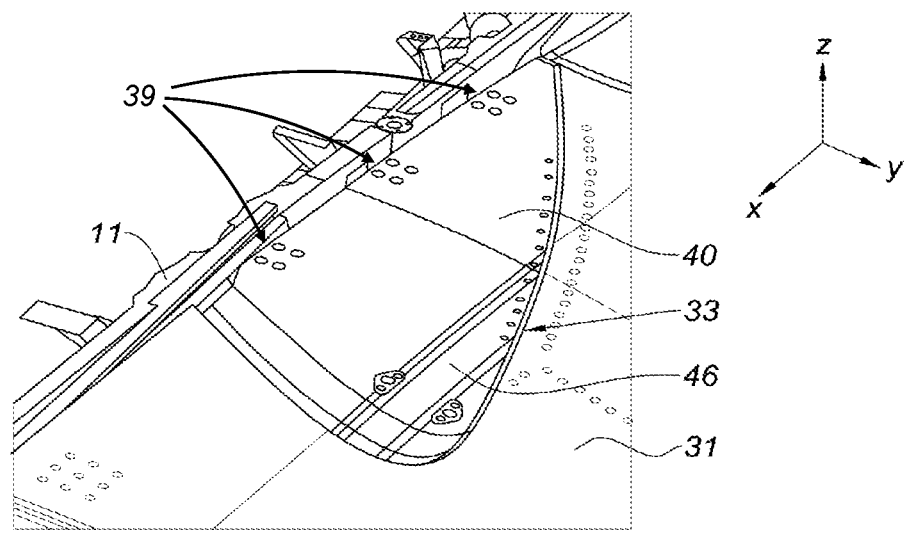
FIG. 5 is an enlarged perspective view of an avoidance panel on a thrust reverser in the closed position according to the present disclosure.

FIGS. 2, 3 and 4 show a nacelle 1 of a turbojet engine suspended from a pylon 16, by means of a beam 11, disposed in a vertical plane, the nacelle including the front air intake 3, then starting downstream, fixed cowls surrounding the median section 4, and two movable cowls 31 each substantially forming a semicircle, which join the beam 11 in the upper portion.

The movable cowls 31 are guided by longitudinal rails (see FIG. 4) which radially frame cascades 32 installed around the nacelle 1, including vanes for straightening the cold air flow 12 upstream. Primary rails 111 are radially disposed inward of the cascades 32, and secondary rails 112 outward.

The cascades 32 are supported on the upstream side by a fixed front frame 32A and on the downstream side by a fixed rear frame 32B (see FIG. 8), which each form a circular support structure around the nacelle 1. It will be noted that in the FIG. 8, for reasons of clarity, the movable cowl 31 is not illustrated.

As represented in FIG. 3, the OFS, and in particular the thrust reverser 30, comprises at least one movable cowl 31, movable along the longitudinal axis Δ so as to allow the evacuation of the air flow 12 circulating in the flow path 10 during a thrust reversal phase.

More specifically, the rear movable cowl(s) 31 (here two) axially slide downstream under the effect of cylinders, by deploying flaps (not illustrated) in the annular flow path in an open position of the thrust reverser in order to at least partially close the flow path 10. These flaps return the cold air flow 12 radially outwards through cascades 32 uncovered during sliding, comprising vanes which direct the flow forward.

The wing 36 of the aircraft on which the nacelle 1 is attached typically includes elements which can cause interference with the movable cowl 31, and more specifically with a radially outer portion 33 of said movable cowl 31 located near a leading edge of the wing. By way of example, mention may be made of spoilers 37 facilitating the landing and braking of the aircraft (see FIGS. 2 and 3).

The movable cowl 31 includes at least one avoidance panel 40 on the radially outer portion 33, said avoidance panel 40 being intended to avoid an interference with a movable slat of the leading of the aircraft wing. To provide this function, the kinematics of the avoidance panel 40 during the thrust reversal is made different from that of the movable cowl 31.

According to the present disclosure, the avoidance panel 40 is pivotally mounted relative to a fixed structure of the thrust reverser 30 and longitudinally fixed in translation relative to said fixed structure. In particular in this form, the avoidance panel 40 is fixed to the beam 11 of the nacelle 1 and pivotally mounted relative to said beam 11. As an alternative or in addition, the avoidance panel 40 can be fixed to the IFS 8. The beam 11 can also be considered in certain cases, depending on the configuration of the nacelle, as an element of the IFS 8.

More specifically, the avoidance panel 40 is fixed to the fixed structure by a pivot connection 41, provided by hinges 39 aligned longitudinally relative to the thrust reverser 30. In this case, fixing clevis provided for this purpose are formed on the beam 11, and in one form, is integral with said beam 11. In alternative configurations, the hinges 39 can be attached on the beam 11, or a portion of these hinges 39. More generally, the pivoting connection means can be attached in whole or in part on the beam 11, the pivoting function being able to be carried out in different ways (deformable element, dovetail, elastic articulation part commonly called "silent block," etc.).

Each movable cowl 31 includes, in its upper portion, next to the beam 11, a cutout situated between its upstream and downstream ends, which receives an avoidance panel 40 completely closing the opening when the thrust reverser 30 is in its closed position.

A longitudinal fairing 34 can be inserted between the beam 11 and the movable cowl 31 as well as the avoidance panel 40. The fairing 34 is secured to the beam 11 and/or the IFS 8 and has the function of hiding certain fixing elements such as the hinges which allows attaching said beam 11 to the pylon 16.

For a given nacelle 1, as is the case in these figures, an avoidance panel 40 can be disposed on each side of the beam 11.

In certain cases, as a function of the configuration of the nacelle relative in particular to the movable slat of the associated aircraft, an avoidance panel 40 can be disposed only on one of the sides of the beam 11. In fact, it can be noted for example that the spoilers 37 are not always present on each side of the nacelle 1.

Generally, the avoidance panel 40 is disposed so as to be near or under the spoiler of the wing when the nacelle is mounted on the wing.

In the case where a single avoidance panel 40 equips the nacelle, the configuration is that generally, for a left wing when looking at the aircraft from the front, the avoidance panel 40 is mounted to the left of the tip 14 of the nacelle when looking at the latter from the front, namely facing the air intake, and for a right wing, when looking at the aircraft from the front, the avoidance panel 40 is mounted at the right of the tip 14 of the nacelle of the present disclosure when looking at the latter 1 from the front, namely facing the air intake.

In this closed position, the avoidance panel 40 has an external surface arranged to be swept by the external flow to the nacelle 1 which is located in continuity with the external surface of the adjacent movable cowl 31.

The avoidance panel 40 has a shape substantially of an oblong wing. In particular here, the avoidance panel has a substantially rounded upstream end and a downstream end which tapers downstream. The shape is advantageous in that it constitutes a reduced cutout in order to avoid the intersection of the area with the edge of the wing (which forms a horizontal plane on the underside of the slat) while providing the outer aerodynamic line (cylindro-conical). It is possible for various reasons to extend its dimensions but this could nonetheless be to the detriment of the performance in thrust reversal because the avoidance panel 40 locally closes the outlet section of the reverse flow.

The thrust reverser 30 further comprises at least one energy storage device 50 configured so that the avoidance panel 40 is constrained to radially bear against the movable cowl 31.

Figure 6:
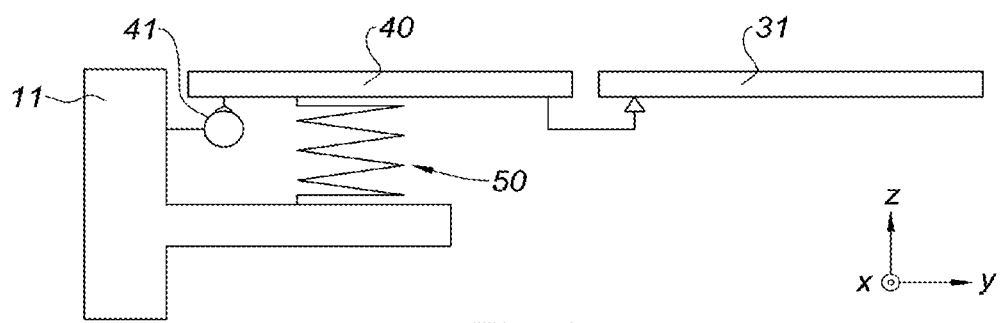
FIG. 6 is a block diagram of the connections between an avoidance panel, a fixed structure and a movable cowl of a thrust reverser according to the present disclosure.
Figure 7:
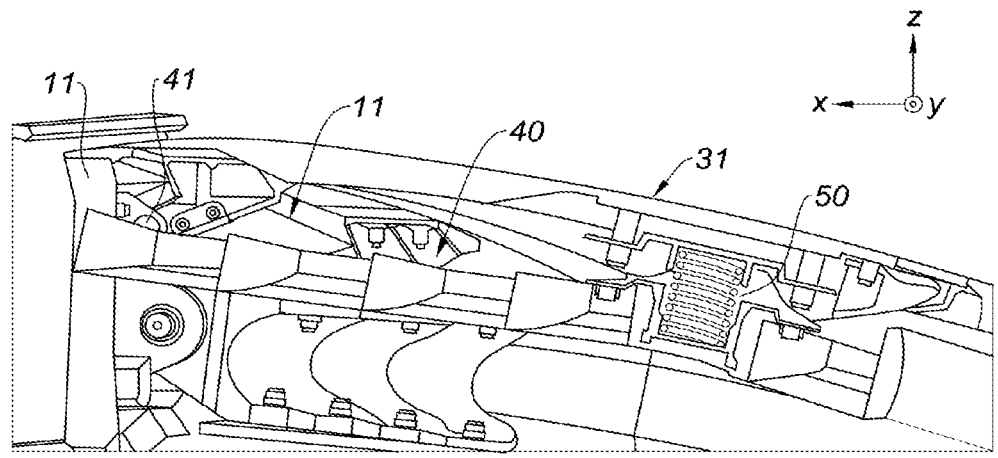
FIG. 7 is a detailed view of an avoidance panel according to the present disclosure.

The energy storage device 50, in one form, comprises an elastic return device such as a spring, as illustrated in FIGS. 6 and 7. The energy storage device 50 is disposed between the fixed structure and the avoidance panel 40 so to provide the elastically constrained bearing of said avoidance panel 40 against the movable cowl 31.

This constrained bearing of the avoidance panel 40 against the movable cowl, in particular radially under the said movable cowl, is applied and maintained whatever the position of the movable cowl 31, in the closed position, in the open position or in an intermediate position to these two positions.

Figure 8:
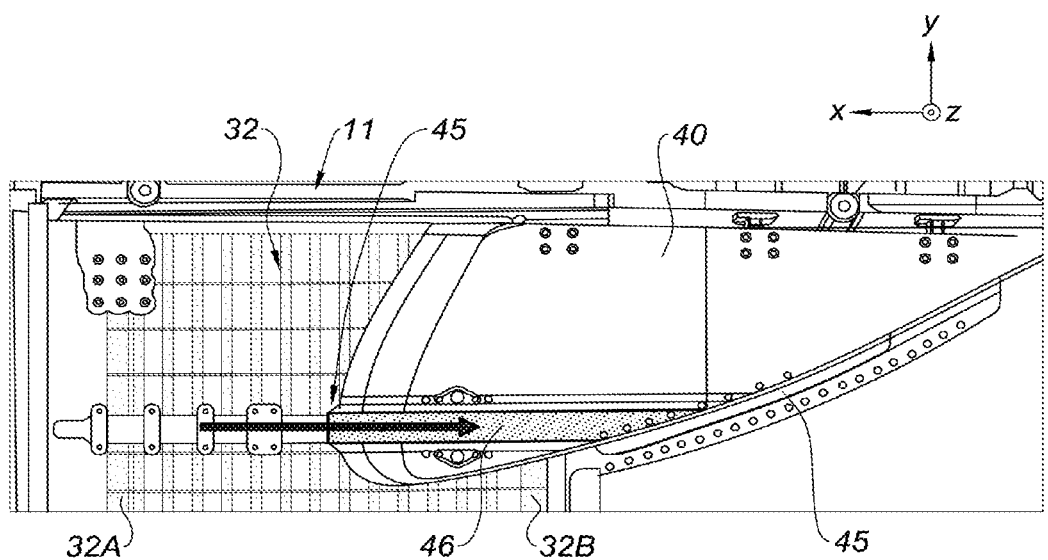
FIG. 8 is a top view of an avoidance panel in a closed position of the thrust reverser according to the present disclosure.

Indeed, in the closed position, the avoidance panel 40 is constrained to contact and to bear against the movable cowl 31 at bearing areas 45 located on the periphery of said avoidance panel 40 (see FIG. 8).

This configuration is advantageous because it allows a good compromise between reducing the overlap areas between the movable cowl and the avoidance panel 40 while offering good management of the operating clearances commonly called "step and gaps," all around the panel, or at least on the areas where it is kinematically possible. These bearing areas are, in this form, discontinuous on the circumference of the avoidance panel 40 and has at least one upstream bearing area and a downstream bearing area.

In particular, the avoidance panel 40 includes in the closed position two bearing areas 45, one located on an upstream edge and the other on a downstream edge. These bearing areas 45 are each formed by a localized extension of the avoidance panel 40, these extensions having a recess directed radially towards the inside of the nacelle and of a bearing portion coming under the movable cowl 31 in the closed position. The recess allows the bearing portion to be secured with the avoidance panel 40 while being located radially under the movable cowl in the closed position while presenting an external surface of the avoidance panel 40 which is flush with the external surface of the movable cowl 31 in order to provide aerodynamic continuity of the nacelle 1.

In the configuration illustrated in the figures, the downstream bearing area 45 extends at the periphery of the avoidance panel over an extent, or width, greater than that of the upstream bearing area 45. In fact, the downstream bearing area 45 is extended to the maximum of what the size and kinematics allow in order to better manage the operating clearances. The downstream bearing area 45, in one form, extends over at least 50% of the width of the avoidance panel 40, and/or over at least 50% of the length of its upstream edge.

When the thrust reverser 30 passes from the closed position to the open position, the movable cowl 31 abuts against an upstream edge 42 of the avoidance panel 40 which has a guide slope arranged to guide the movable cowl 31 radially above the avoidance panel when said movable cowl moves back towards the open position. In particular here, the guide slope is formed by the recess of the bearing area 45.

Moreover, during the opening of the thrust reverser, in an intermediate position until in the open position of the movable cowl 31, the avoidance panel 40 is constrained to contact and to bear against the movable cowl 31 at a bearing area 46 located on an external surface of the avoidance panel 40. During this movement, the movable cowl 31 slides over the bearing area 46 (see FIG. 8). Moreover, as is particularly visible in FIGS. 8 and 9, the bearing area 46 located on the external surface of the avoidance panel 40 is located substantially in the extension, and in one form even continuous, of the bearing area 45 upstream, located on the upstream edge of said avoidance panel.

Figure 9:
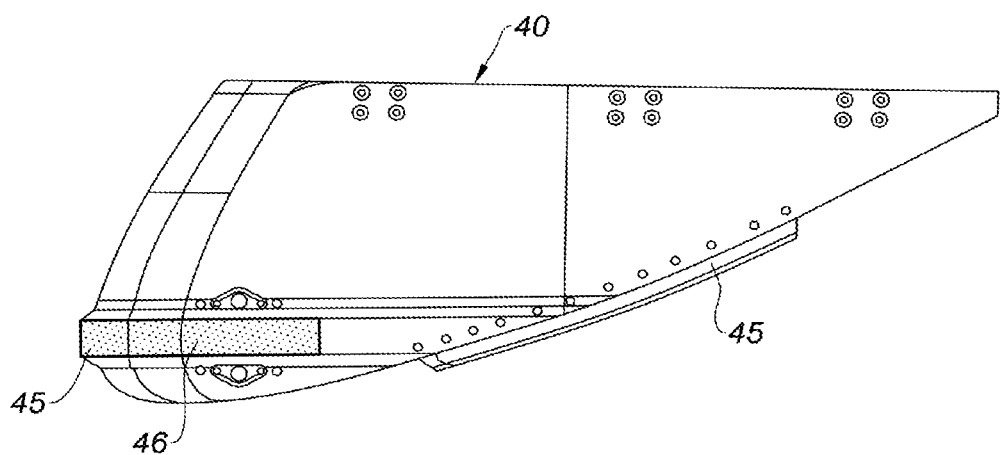
FIG. 9 is a top view of an avoidance panel according to one form of the present disclosure.

The bearing area 46 extends longitudinally from the upstream edge to the downstream edge of the avoidance panel 40, as can be seen in FIG. 8. Depending on the predetermined stroke of the movable cowl 31, the bearing area 46 can extend longitudinally from the upstream edge without however reaching the downstream edge: the bearing area 46 therefore extends longitudinally in this case only over a portion of the avoidance panel from its upstream edge, as illustrated in FIG. 9. Furthermore, the bearing area is angularly offset relative to the fixed structure. The angular offset is particularly advantageous for managing the stop of the degree of freedom in rotation, namely the pivots, as far as possible from the axis of rotation. In an equally favorable configuration, the bearing area 46 is located opposite the (or aligned with the) energy storage/elastic return device 50, namely the spring, (the avoidance panel 40 being located between the bearing area 46 and the spring). This configuration in fact allows reducing the bending constraints of the avoidance panel 40. In other words, the energy storage/elastic return device 50 is located radially substantially perpendicular to the bearing area 46.

The bearing area 46 being swept by the external air flow to the nacelle in flight phase, the bearing area 46 is advantageously configured so as to be substantially flush with the external surface of the avoidance panel 40, that is to say it is not offset or slightly offset from said external surface of the avoidance panel 40.

The bearing areas 45, 46 thus each have a contact strip or rub strip (not shown) arranged to provide the structural and aerodynamic integrity of the avoidance panel 40 and of the movable cowl 31. Materials suitable for rubbing may be used for this purpose such as a polymeric material, for example polytetrafluoroethylene (PTFE). In the event of wear it is thus possible to change only the rub strip and not the part of nacelle 1.

In the case described hereinabove where the bearing area 46 located on the external surface of the avoidance panel 40 is located substantially in the continuous extension of the upstream bearing area 45, located on the upstream edge of said avoidance panel, the rub strip of the upstream bearing area 45 and of the bearing area 46 located on the external surface of the avoidance panel 40 is a single band which extends continuously over these two bearing areas 45, 46.

Such an avoidance panel 40 allows to avoid the possibility of contact between a movable slat 37 of the wing 36 and the movable cowl 31 of the thrust reverser insofar as on each side of the beam 11, the avoidance panel 40 is held longitudinally in its original position by opening the cutout of the movable cowl 31, the portion of the movable slat 37 closest to the nacelle 1 coming near to this cutout with a predetermined safety distance, this in particular when the movable slats 37 of the leading edges of the wings 36 are fully deployed to come forward and downward, in order to improve the lift of the wings at low speeds during landing. This avoids the possibility of contact between these two elements, which could cause wear and failure.

It will be noted that the cutting of the movable cowl 31 being restricted according to the space desired for the proximity of the movable slat 37, a cutting of a reduced size is obtained which makes it possible not to limit the performance of the thrust reverser 30 in this position.

Moreover, in the normal flight position, the avoidance panel 40 coming in continuity with the surface of the movable cowl 31, there is no aerodynamic loss.

FIG. 6 illustrates a block diagram of the connections between the avoidance panel 40, a fixed structure formed by the beam 11 and a movable cowl 31 of a thrust reverser according to one form.

The connection of the avoidance panel 40 with the fixed structure, here the beam 11, is a pivot 41, formed here by a hinge line. Alternatively or additionally, the connection can be achieved by leaves capable of elastically deforming and/or a dovetail.

The connection with the movable structure formed by the movable cowl 31 is formed by planar bearings located at the bearing areas 45, 46. As described hereinabove, one 45 is used in flight, the other 46 is used to hold a position of the avoidance panel 40 compatible with the deployment/retraction of the movable cowl 31 during the deployment/retraction operations.

Other freer connections such as linear, annular, point connections are however possible.

It will be noted that the presence of the two bearing areas 45, 46 is particularly advantageous in view of the great relative mobility of the avoidance panels 40 which is sufficient to disengage so-called "simple" connections. These bearing areas 45, 46, which in one form include rub strips, facilitate the kinematics compatibility of the movable cowl 31 with the avoidance panel 40.

A spring mechanism forming the energy storage device 50, itself including inner degrees of freedom compatible with the connections described hereinabove allows holding the contacts and the bearing constraints in the connections of the avoidance panel 40 with the movable cowl 31. The energy storage device 50 extends substantially radially and is disposed radially under the avoidance cowl 40 and on a support clevis of the fixed structure formed by the beam 11. The clevis can be a part attached on the beam 11.

The energy storage device 50 can be replaced by other means such as gas, hydraulic, magnetic suspension mechanisms or any other suitable means. This system can be located in other places under the avoidance panel so that it exerts an inner force between the fixed structure 11 and the avoidance panel 40.

The avoidance cowl 40 is also longitudinally dimensioned so that the constraint which it provides against the movable cowl 31 in its open position is not released during the entire stroke of the movable cowl 31. In other words, whatever the position of the movable cowl 31, the avoidance panel is constrained to bear against the movable cowl and a force between the fixed structure and the avoidance panel is maintained.

The present disclosure is described in the foregoing by way of example. It is understood that one skilled in the art is able to carry out different variants of the present disclosure without going beyond the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for an aircraft engine nacelle, the thrust reverser comprising:
   a movable cowl movable from a closed position in which thrust is not reversed to an open position for uncovering cascades reversing a direction of a cold air flow which is deflected from an annular secondary air flow path, the movable cowl including a radially outer portion located near a leading edge of an aircraft wing and at least one avoidance panel on the radially outer portion adapted to inhibit interference with a movable slat of the aircraft wing, wherein the at least one avoidance panel is pivotally mounted relative to a fixed structure of the thrust reverser; and at least one energy storage device configured so that the at least one avoidance panel is constrained to bear against the movable cowl at least when the thrust reverser is in the closed position, and to contact and bear against the movable cowl at a bearing area when the thrust reverser is in the open position, the bearing area being located on an external surface of the at least one avoidance panel.

2. The thrust reverser according to claim 1, wherein the at least one avoidance panel is fixed in translation relative to the fixed structure.

3. The thrust reverser according to claim 1, wherein the at least one avoidance panel is fixed to the fixed structure by a pivot connection by hinges longitudinally aligned relative to the thrust reverser.

4. The thrust reverser according to claim 1, wherein the bearing area is a first bearing area and wherein, in the closed position, the at least one avoidance panel is constrained to contact and bear against the movable cowl at a plurality of second bearing areas, the plurality of second bearing areas being located on a periphery of the at least one avoidance panel.

5. The thrust reverser according to claim 1, wherein the bearing area has a contact strip.

6. The thrust reverser according to claim 1, wherein the at least one energy storage device is an elastic return device.

7. The thrust reverser according to claim 6, wherein the elastic return device is a spring.

8. The thrust reverser according to claim 1, wherein the at least one energy storage device is disposed between the fixed structure and the at least one avoidance panel so as to constrain the at least one avoidance panel to bear against the movable cowl.

9. The thrust reverser according to claim 1, wherein the at least one avoidance panel is constrained to bear against the movable cowl, in the closed position and in the open position.

10. A nacelle for a bypass aircraft engine comprising an air inlet upstream of the bypass aircraft engine, a median section surrounding an engine fan, a downstream section delimiting an annular flow path adapted to circulate an air flow and accommodate a thrust reverser according to claim 1.

* * * * *